United States Patent [19]
Guild

[11] Patent Number: 5,697,629
[45] Date of Patent: Dec. 16, 1997

[54] MOTORCYCLE TOWING APPARATUS

[76] Inventor: Neville Guild, 16 Hammerton Street, Lower Hutt, New Zealand

[21] Appl. No.: 569,445

[22] Filed: Dec. 8, 1995

[30] Foreign Application Priority Data

Dec. 9, 1994 [NZ] New Zealand ............................ 270111

[51] Int. Cl.⁶ ...................................................... B60R 9/10
[52] U.S. Cl. ...................... 280/402; 414/430; 414/462
[58] Field of Search ............................... 414/563, 462, 414/463, 466, 537, 430; 280/402

[56] References Cited

U.S. PATENT DOCUMENTS

| | | | |
|---|---|---|---|
| 2,280,734 | 4/1942 | Tyler | 280/402 |
| 2,789,832 | 4/1957 | Zumwalt | 280/402 |
| 3,430,983 | 3/1969 | Jones | 280/402 |
| 3,458,073 | 7/1969 | Dawson | 280/402 X |
| 3,529,737 | 9/1970 | Daugherty | 414/462 |
| 3,713,672 | 1/1973 | Robbins | 280/402 |
| 3,740,074 | 6/1973 | Coil | 280/402 |
| 3,764,163 | 10/1973 | Ortman et al. | 280/402 |
| 3,776,572 | 12/1973 | Bane | 280/402 X |
| 3,778,087 | 12/1973 | Kallenbach | 280/402 X |
| 3,822,898 | 7/1974 | Brownlie | 280/402 |
| 3,843,001 | 10/1974 | Willis | 414/462 |
| 3,979,137 | 9/1976 | Lipscomb, Jr. et al. | 280/402 |
| 5,123,802 | 6/1992 | Bell | 414/563 |
| 5,145,308 | 9/1992 | Vaughn et al. | 414/462 |
| 5,228,712 | 7/1993 | Speier | 280/402 X |
| 5,234,307 | 8/1993 | Scott | 414/467 |
| 5,362,195 | 11/1994 | Wagner | 414/483 |

FOREIGN PATENT DOCUMENTS 904744 2/1954 Germany ............................ 280/402
WO 93/18936 9/1993 WIPO .

*Primary Examiner*—David A. Bucci
*Attorney, Agent, or Firm*—Shlesinger, Arkwright & Garvey LLP

[57] ABSTRACT

A motorcycle towing apparatus comprises a securing device adapted to secure a front wheel of a motorcycle; a coupler to secure the securing device to a towbar of a vehicle in such a manner that the securing device is disposed a distance above the ground and rotatable in a substantially horizontal plane about the towbar; a rigid member extending from a proximal end connected to the securing device to a distal end; and a fastener adapted to secure the distal end of the rigid member to the body of the motorcycle to maintain the front wheel of the motorcycle in fixed relation to a body of the motorcycle. The rigid member is pivotally connected at its proximal end to the securing device so that it may be extended outwardly from the securing device during use and rotated towards the securing device to make the apparatus compact when not being used to tow the motorcycle. The rigid member in the extended position is adapted to function as a ramp when the front wheel of the motorcycle is guided into the securing device.

16 Claims, 4 Drawing Sheets

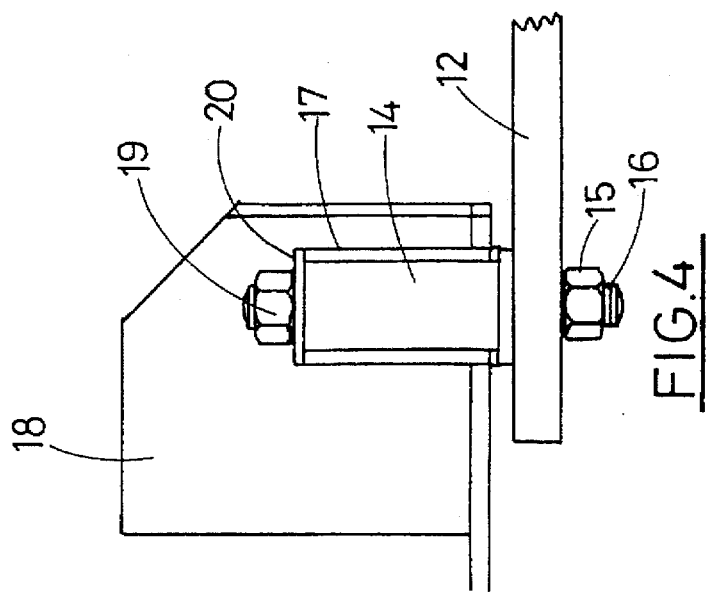
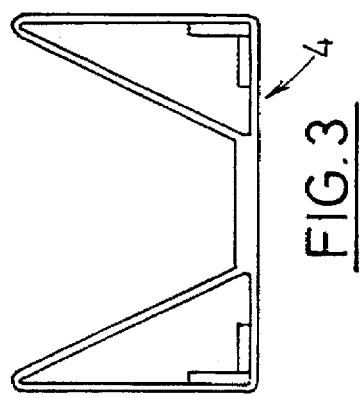
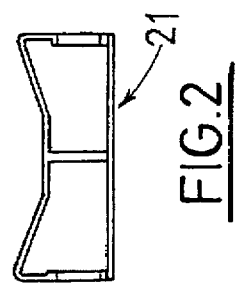

MOTORCYCLE TOWING APPARATUS

FIELD OF THE INVENTION

The present invention relates to a vehicle towing apparatus suitable for towing a vehicle such as a motorcycle behind a vehicle such as a car.

BACKGROUND OF THE INVENTION

To the present time devices for towing motorcycles and the like behind a vehicle have been complex and/or expensive and/or inconvenient. Typically, it has been necessary to secure the motorcycle to a trailer specifically adapted to carry a motorcycle.

It has been proposed to tow a motorcycle behind a vehicle by securing a front wheel of a motorcycle to a tow bar so that the wheel is fixed relative to the vehicle. The steering head of the motorcycle is allowed to rotate so that the motorcycle tilts as the vehicle turns. This arrangement has the disadvantage during backing or a tight turn that the motorcycle may tip over if the steering head is allowed to rotate too far.

Further, many prior arrangements have the disadvantage that they are bulky and cannot be easily and conveniently transported.

SUMMARY OF THE INVENTION

It is an object of the present invention to provide a towing apparatus which overcomes the problems of the prior art or at least provides the public with a useful choice.

Accordingly, there is provided a motorcycle towing apparatus comprising:

securing means for securing the front wheel of a motorcycle to the towing apparatus;

coupling means for securing the securing means to a tow bar of a vehicle in such a manner that the securing means may rotate in a substantially horizontal plane about the tow bar; and stabilizing means for maintaining the front wheel of the motorcycle in fixed relation to the body of the motorcycle.

Preferably the stabilizing means comprises a rigid member extending from a proximal end connected to the securing means to a distal end having fastening means for securing the distal end to the body of the motorcycle.

The stabilizing means preferably acts as a ramp also and is pivotally connected to the securing means so that it can be extended in use and rotated towards the securing means to make the apparatus compact for storage.

BRIEF DESCRIPTION OF THE DRAWINGS

The invention will now be described by way of example of a preferred embodiment with reference to the accompanying drawings in which:

FIG. 2: shows a cross-sectional view of the ramp along line A—A.

FIG. 3: shows a cross-sectional view of the channel section along line B—B.

FIG. 4: shows the coupling assembly in detail.

DETAILED DESCRIPTION OF PREFERRED EMBODIMENT

Figure 1:
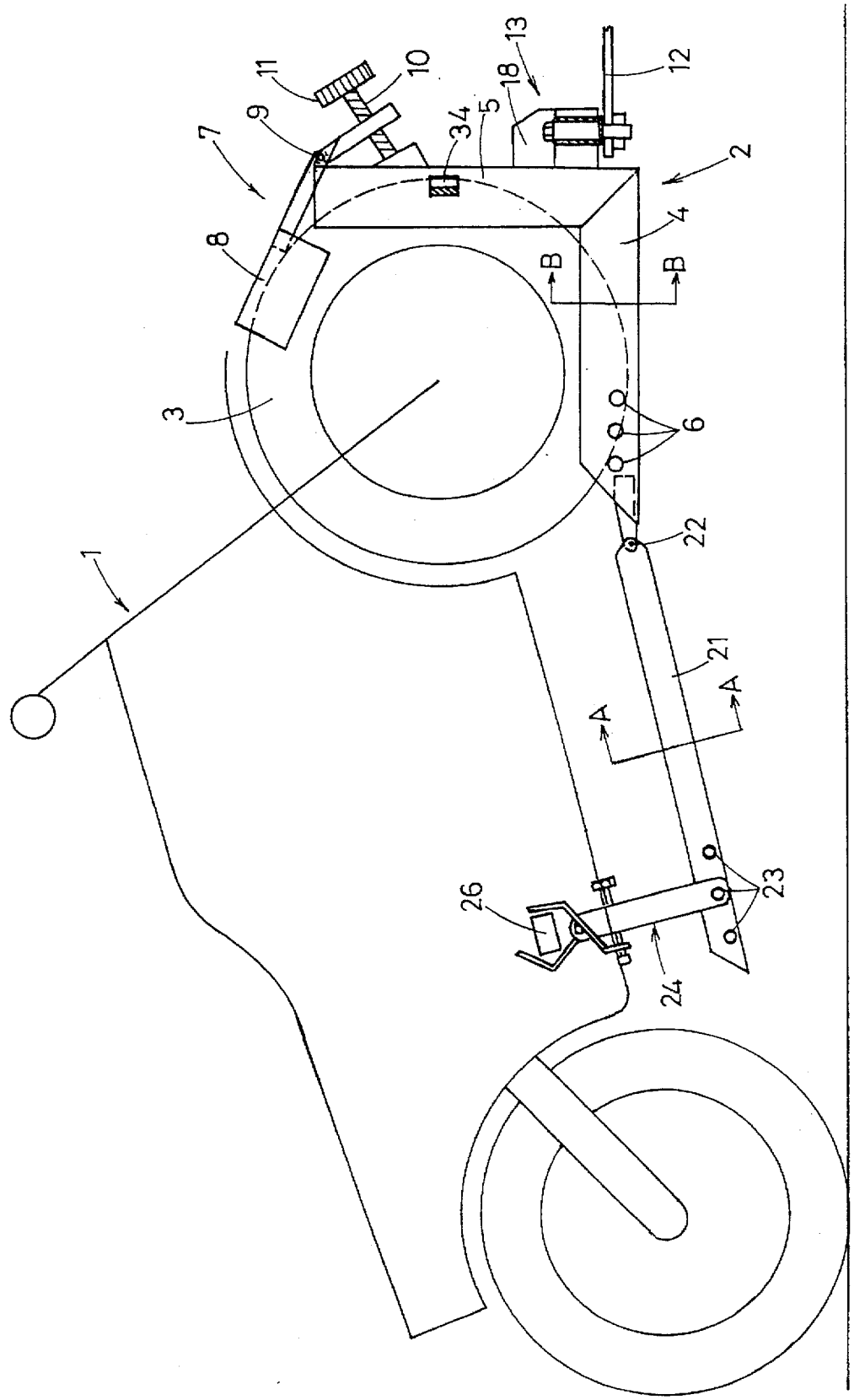
FIG. 1: shows a motorcycle towing apparatus towing a motorcycle.

Referring firstly to FIG. 1 there is shown a motorcycle 1 secured to a motorcycle towing apparatus 2 by its front wheel 3. Front wheel 3 rests within lower and upper channel sections 4 and 5. As shown in FIG. 3, the cross-section of channel members 4 and 5 along line B—B is substantially V-shaped. This ensures that a range of tire widths may be securely held by channel members 4 and 5. Channels 4 and 5 may preferably be formed of extruded metal.

A number of apertures 6 are provided along either side of the lower channel member 4. When the wheel of a motorcycle is in the position shown in FIG. 1 a rod is placed through the appropriate apertures in each side and is secured in place (for example by nuts fastened to threaded ends of the rods). The apertures 6 selected will depend on wheel size to ensure the wheel is best secured.

A clamping means 7 holds wheel 3 firmly within channel members 4 and 5. Clamping member 8 is pivotally connected to upper member 5 at pivot 9. Thread 10 engages with a complimentary thread in clamping member 8 so that rotation of knob 11 will force clamping member 8 towards or away from wheel 3.

The motorcycle towing apparatus 2 is secured to a tow bar 12 of a vehicle via coupling means 13 (shown in FIG. 4). Coupling means 13 includes a spindle 14 secured to tow bar 12 via a nut 15 secured to threaded portion 16. Sleeve 17 is secured to coupling member 18 and is rotatable about spindle 14. Sleeve 17 is retained on spindle 14 by nut 19 and washer 20.

Referring again to FIG. 1, ramp 21 is seen to be pivotally connected to lower channel member 4 about pivot 22. The cross-sectional view of ramp 21 along line A—A as shown in FIG. 2. The ramp 21 is seen to have a shallow V profile to guide the wheel along the ramp as it is pushed into channel sections 4 and 5. Ramp 21 may preferably be formed of extruded metal.

At the distal end of ramp 21 are provided spaced-apart apertures 23. Fastening means 24 are pivotally connected on each side of ramp 21 via a bolt passing through aperture 25 of the fastening means 24 and apertures 23 of the ramp 21. Fastening means 24 secure the distal end of ramp 21 to foot steps 26 of the motorcycle.

The fastening means is seen to include a body portion 27 having a jaw 28 provided at the distal end thereof. By rotating knob 31 threaded shaft 32 draws nut 33 towards or away from body 27. This causes the distal end of jaw 29 to move towards or away from jaw 28. The aperture through which fastening means 24 is secured will be selected according to the dimensions of the motor bike to be fastened. Lug 34 may be provided so that a safety chain can be secured to tow bar 12.

Figure 7:
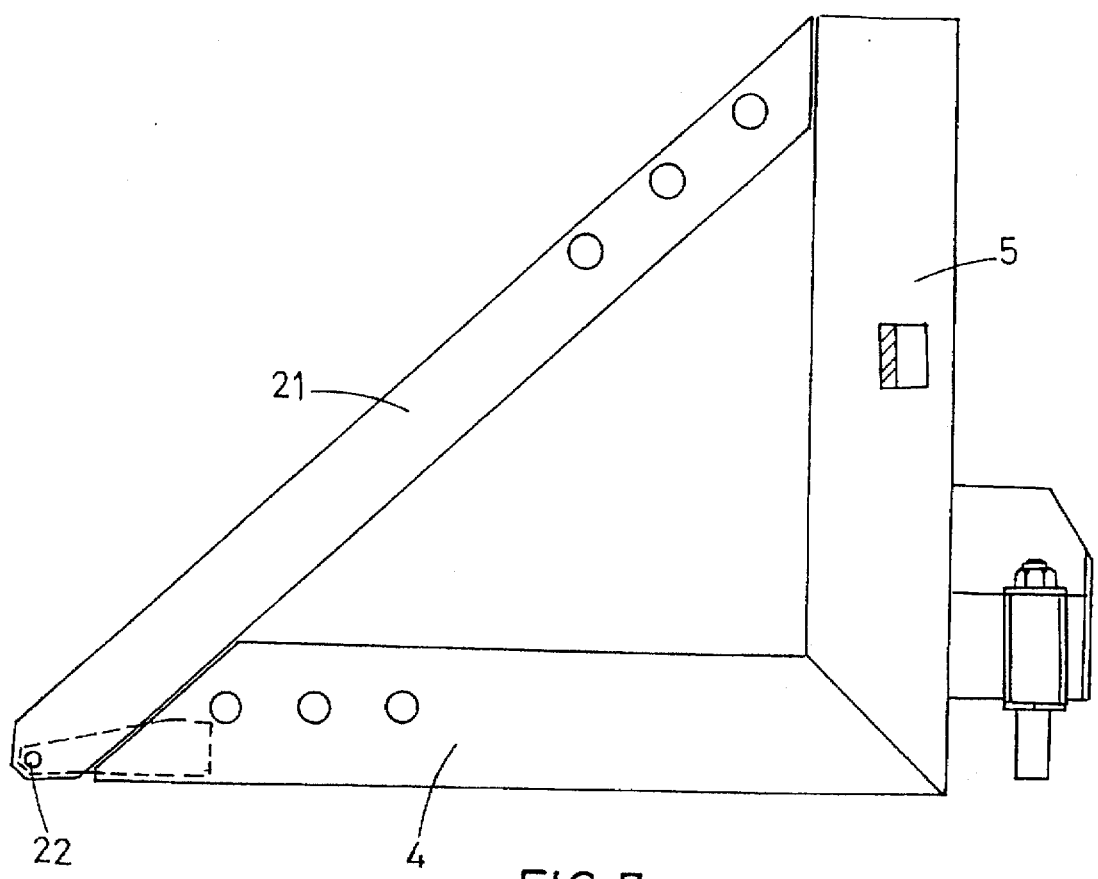
FIG. 7: shows the main components of the motorcycle towing apparatus in its folded condition.

When not in use the motorcycle towing apparatus 2 may be folded for transportation as shown in FIG. 7. In this configuration the motorcycle towing apparatus may be placed within the boot of a vehicle and conveniently transported.

When in use threaded portion 16 of spindle 14 may be inserted through a hole in tow bar 12 (connected to the towing vehicle and secured thereto by nut 15). Ramp 21 may be rotated anti-clockwise until it contacts the ground. The front wheel of a motorcycle may then be pushed up ramp 21 so that the front wheel rests within channel members 4 and 5, as shown in FIG. 1. A rod is then placed through apertures 6 passing from one side of channel member 4 to the other.

The rod may be secured in place by bolts or other suitable fastening means. The aperture selected will depend upon the size of front wheel 3 and will be selected to keep the wheel 3 snuggly against channel member 5.

Knob 11 will then be rotated to force clamping member 8 towards wheel 3 to clamp it in place. The portion of clamping member 8 engaging wheel 3 will have similar cross-section to that of the channel members 4 and 5 shown in FIG. 3. For additional security a chain or other securing means may pass around channel member 5 through wheel 3 to provide additional security.

Figure 6:
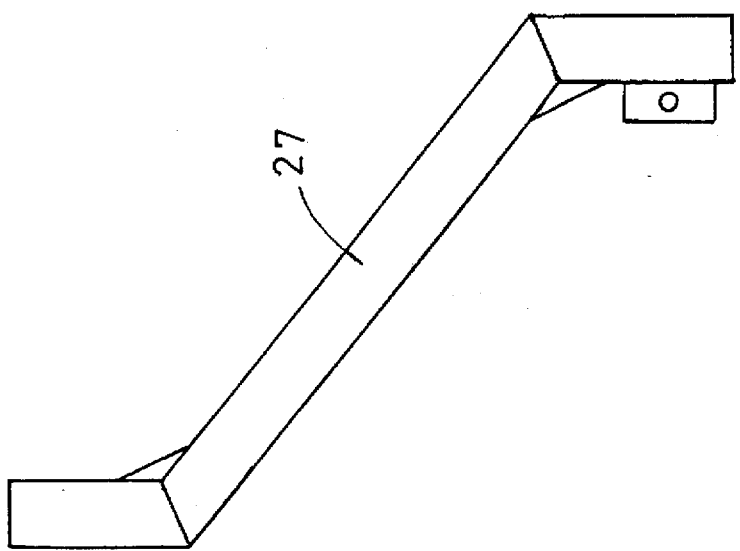
FIG. 6: shows a side view of the fastening means.
Figure 5:
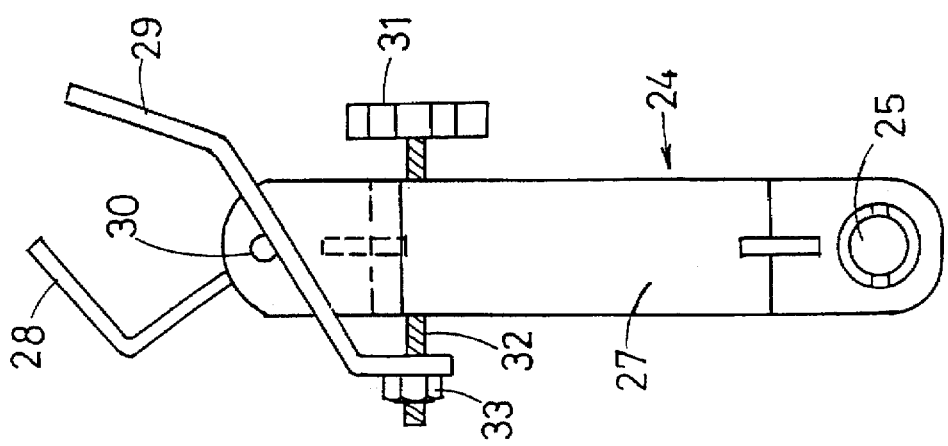
FIG. 5: shows a plan view of the fastening means.

If not already in place fastening members 24 will be secured through an appropriate aperture 23 to be pivotally connected to ramp 21. The fastening means 24 extend outwardly from ramp 21 on either side (see FIG. 6). Fastening means 24 may then be secured to footrest 26 by rotating knob 31 so that jaws 28 and 29 clamp footrest 26 therebetween.

The arrangement of ramp 21 and fastening means 24 ensures that the steering head is effectively immobilised and the front wheel is kept in fixed relation relative to the body of the motorcycle 1. This arrangement constitutes a stabilizing means which prevents the motorcycle from tipping over during reversing or tight cornering.

The pivotal coupling 13 enables the motorcycle towing apparatus to rotate relative to a towing vehicle in a horizontal plane about spindle 14.

Once towed to a desired destination fastening means 24 may be released so that the lower end of ramp 21 rests on the ground. Clamping means 7 may then be released and the cycle may be removed. Clamping member 8 may be rotated anti-clockwise to rest within channel member 5. Ramp 21 may be rotated clockwise to the position shown in FIG. 7. The apparatus may then be removed in its compact form for storage.

Where in the foregoing description reference has been made to integers or components having known equivalents then such equivalents are herein incorporated as if individually set forth.

Although this invention has been described by way of example it is to be appreciated that improvements and/or modifications may be made thereto without departing from the scope of the present invention as defined in the appended claims.

I claim:

1. A motorcycle towing apparatus comprising:
   securing means for securing a front wheel of a motorcycle;
   coupling means for securing the securing means to a towbar of a vehicle in such a manner that the securing means is rotatable in a substantially horizontal plane about the towbar;
   stabilizing means for maintaining the front wheel of the motorcycle in fixed relationship to a body of the motorcycle;
   the stabilizing means comprising a rigid member extending from a proximal end connected to the securing means to a distal end having fastening members pivotally connected to either side of the rigid member and having jaws at their distal ends for securing the rigid member to the body of the motorcycle; and
   the stabilizing means being pivotally connected at its proximal end to the securing means so that it may be extended outwardly from the securing means during use and rotated towards the securing means to make the apparatus compact for storage.

2. Apparatus as claimed in claim 1 wherein securing means includes a channel section surrounding the lower and front outer portions of the front wheel.

3. Apparatus as claimed in claim 2 wherein the channel section is substantially V-shaped in cross-section to accommodate a variety of wheel widths.

4. Apparatus as claimed in claim 2 wherein the securing means includes clamping means for forcing an upper portion of said front wheel towards a lower portion of said channel section.

5. Apparatus as claimed in claim 4 wherein the clamping means is pivotally connected to an upper edge of said channel section and can rotate towards said channel section to be compactly stored therein when not in use.

6. Apparatus as claimed in claim 4 wherein said channel section is provided with a plurality of transverse apertures therethrough for receiving a rod which maintains said front wheel against said channel section.

7. A motorcycle towing apparatus as claimed in claim 1 wherein the stabilizing means in the extended position can act as a ramp when the front wheel of the motorcycle is guided into the securing means.

8. A motorcycle towing apparatus as claimed in claim 1 wherein the jaws are for being secured to footrests of the motorcycle.

9. A motorcycle towing apparatus comprising:
   securing device adapted to secure a front wheel of a motorcycle;
   coupler to secure the securing device to a towbar of a vehicle in such a manner that the securing device is disposed a distance above the ground and rotatable in a substantially horizontal plane about the towbar;
   a rigid member extending from a proximal end connected to the securing device to a distal end;
   fastening members adapted to secure the distal end of the rigid member to the body of the motorcycle to maintain the front wheel of the motorcycle in fixed relation to a body of the motorcycle;
   the rigid member being pivotally connected at its proximal end to the securing device so that it may be extended outwardly from the securing device during use and rotated towards the securing device to make the apparatus compact when not being used to tow the motorcycle; and
   the rigid member in the extended position is a ramp when the front wheel of the motorcycle is guided into the securing device.

10. Apparatus as claimed in claim 9 wherein the fastening members include jaws at their distal ends for securing to the body of the motorcycle.

11. Apparatus as claimed in claim 9 wherein the fastening members are pivotally connected to either side of the rigid member.

12. Apparatus as claimed in claim 9 wherein the securing device includes a channel section for surrounding lower and front outer portions of the front wheel.

13. Apparatus as claimed in claim 12 wherein the channel section is substantially V-shaped in cross-section.

14. Apparatus as claimed in claim 12 wherein the securing device includes a clamp for forcing the front wheel towards the channel section.

15. Apparatus as claimed in claim 14 wherein the clamp is pivotably connected to an upper portion of the channel section such that the clamp can rotate towards the channel section to be stored therein when not in use.

16. Apparatus as claimed in claim 10 wherein the jaws are for securing to foot rests of the motorcycle.

* * * * *